United States Patent
Campbell et al.

(10) Patent No.: US 6,921,785 B2
(45) Date of Patent: Jul. 26, 2005

(54) FLAME RETARDANT RESINOUS COMPOSITIONS AND METHOD

(75) Inventors: John Robert Campbell, Clifton Park, NY (US); Thomas Miebach, Ballston Spa, NY (US)

(73) Assignee: General Electric Company, Niskayuna, NY (US)

(*) Notice: Subject to any disclaimer, the term of this patent is extended or adjusted under 35 U.S.C. 154(b) by 189 days.

(21) Appl. No.: 10/222,383

(22) Filed: Aug. 16, 2002

(65) Prior Publication Data

US 2004/0034132 A1 Feb. 19, 2004

(51) Int. Cl.$^7$ ............................................. C08K 5/521
(52) U.S. Cl. ................... 524/127; 524/141; 524/145; 524/262
(58) Field of Search ............................. 524/127, 141, 524/145, 262

(56) References Cited

U.S. PATENT DOCUMENTS

| | | |
|---|---|---|
| 3,544,514 A | 12/1970 | Schnell et al. |
| 3,635,895 A | 1/1972 | Kramer |
| 3,671,487 A | 6/1972 | Abolins |
| 3,723,373 A | 3/1973 | Lucas |
| 4,001,184 A | 1/1977 | Scott |
| 4,217,438 A | 8/1980 | Brunelle et al. |
| 4,269,762 A | 5/1981 | Thomas |
| 4,579,906 A | 4/1986 | Zabrocki et al. |
| 5,266,618 A | 11/1993 | Watanabe et al. |
| 5,521,230 A | 5/1996 | Bhatia et al. |
| 5,530,083 A | 6/1996 | Phelps et al. |
| 5,616,674 A | 4/1997 | Michel et al. |
| 5,693,700 A | 12/1997 | Venkataramani et al. |
| 5,714,550 A | 2/1998 | Shaw |
| 5,804,654 A | 9/1998 | Lo et al. |
| 6,072,011 A | 6/2000 | Hoover |
| 6,242,520 B1 | 6/2001 | Venkataramani et al. |
| 6,284,824 B1 | 9/2001 | Iji et al. |

FOREIGN PATENT DOCUMENTS

| | | |
|---|---|---|
| EP | 0174493 | 5/1985 |
| EP | 0305816 | 8/1988 |
| EP | 0 386 511 | 9/1990 |
| EP | 0520186 | 5/1992 |
| EP | 1 126 007 | 8/2001 |
| GB | 857882 | 1/1961 |

OTHER PUBLICATIONS

Application Ser. No. 10/015,049, filed Nov. 12, 2001.

P. Anna et al., "*Influence of Modified Rheology on the Efficiency of Intumescent Flame Retardant Systems*", Polymer Degradation and Stability, Elsevier Science Ltd., vol. 74, pp. 423–426, 2001.

P. Anna et al., "*Intumescent Flame Retardant Systems of Modified Rheology*", Polymer Degradation and Stability, Elsevier Science Ltd., vol. 77, pp. 243–247–426, 2002.

G. Marosi et al., "*Ceramic Precursor in Flame Retardant Systems*", Polymer Degradation and Stability, Elsevier Science Ltd., vol. 77, pp. 259–265–426, 2002.

*Primary Examiner*—Peter A. Szekely
(74) *Attorney, Agent, or Firm*—Andrew J. Caruso; William E. Powell, III

(57) ABSTRACT

Disclosed are flame retardant resinous compositions comprising (i) at least one aromatic polycarbonate, (ii) at least one rubber modified graft copolymer, (iii) at least one silyl borate ester, (iv) at least one organophosphorus compound, and (v) at least one fluoropolymer additive. The compositions exhibit improved surface properties in molded parts.

30 Claims, No Drawings

FLAME RETARDANT RESINOUS COMPOSITIONS AND METHOD

BACKGROUND OF INVENTION

The present invention is related to flame retardant resinous compositions comprising at least one aromatic polycarbonate resin, at least one a rubber modified graft copolymer, at least one silyl borate ester, at least one organophosphorus compound, and at least one fluoropolymer additive.

In the literature, different methods for improving the flame resistance of compositions comprising aromatic polycarbonate resins are described. Typically the methods use either halogenated flame retardants which are said to create potential environmental hazards, or phosphate flame retardants which negatively affect the physical properties of the blends, for example by lowering the heat resistance properties. A method is needed for eliminating or reducing the amount of halogenated or phosphate flame retardants in aromatic polycarbonate-comprising compositions which results in good flame resistance without deterioration in other desirable properties. Shaw in commonly owned U.S. Pat. No. 5,714,550 has disclosed flame retardant polyamide-polyphenylene ether compositions which comprise various types of polymeric siloxane compound and at least one boron compound. There remains a need for developing flame retardant systems applicable to compositions comprising a polycarbonate that show improved boron utilization and improved flame retardancy. There also remains a need for developing flame retardant systems applicable to compositions comprising a polycarbonate that result in reduced decomposition of blend components in molded parts, and reduced coloring and improved surface appearance in molded parts.

SUMMARY OF INVENTION

The present inventors have found that using a silyl borate ester in a resinous composition comprising at least one polycarbonate enhances flame retardant properties while maintaining the surface properties and color characteristics of molded parts of the composition. In various embodiments molded parts of compositions containing a silyl borate ester do not show surface inhomogeneities or discoloration. In addition the use of a silyl borate ester in the compositions leads to a better utilization of boron while reducing water absorption in molded parts of the composition. Although the invention is in no way limited by any theory of operation it is believed that the combination of silicone and boron in a single compound as a silyl borate ester mitigates boron related decomposition of polycarbonate, and delamination or splay associated with incompatible silicone additives. The present invention provides a better overall balance of properties compared to compositions comprising a silicone source and a boron source added as separate compounds.

Thus, in one embodiment the present invention is a flame retardant resinous composition comprising (i) at least one aromatic polycarbonate, (ii) at least one a rubber modified graft copolymer, (iii) at least one silyl borate ester, (iv) at least one organophosphorus compound, and (v) at least one fluoropolymer additive. In another embodiment the present invention is a method to make a flame retardant resinous composition comprising (i) at least one aromatic polycarbonate, (ii) at least one a rubber modified graft copolymer, (iii) at least one silyl borate ester, (iv) at least one organophosphorus compound, and (v) at least one fluoropolymer additive.

DETAILED DESCRIPTION

The flame retardant resinous compositions of the present invention comprise at least one aromatic polycarbonate resin. Aromatic polycarbonate resins suitable for use in the present invention comprise structural units derived from at least one dihydroxyaromatic compound and a carbonate precursor. Suitable dihydroxyaromatic compounds include those represented by the formula (I):

wherein D comprises a divalent aromatic radical. In various embodiments D has the structure of formula (II);

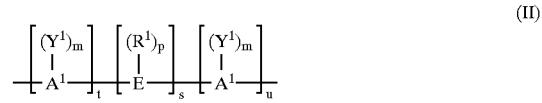

wherein $A^1$ represents an aromatic group such as phenylene, biphenylene, naphthylene, etc. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage including, but not limited to, sulfide, sulfoxide, sulfone; or a phosphorus-containing linkage including, but not limited to, phosphinyl, and phosphonyl. In other embodiments E may be a cycloaliphatic group including, but not limited to, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; a sulfur-containing linkage, such as sulfide, sulfoxide or sulfone; a phosphorus-containing linkage, such as phosphinyl or phosphonyl; an ether linkage; a carbonyl group; a tertiary nitrogen group; or a silicon-containing linkage such as silane or siloxy. $R^1$ represents hydrogen or a monovalent hydrocarbon group such as alkenyl, allyl, alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene. $Y^1$ may be hydrogen, an inorganic atom including, but not limited to, halogen (fluorine, bromine, chlorine, iodine); an inorganic group including, but not limited to, nitro; an organic group including, but not limited to, a monovalent hydrocarbon group such as alkenyl, allyl, alkyl, aryl, aralkyl, alkaryl, or cycloalkyl, or an oxy group such as $OR^2$, wherein $R^2$ is a monovalent hydrocarbon group such as alkyl, aryl, aralkyl, alkaryl, or cycloalkyl; it being only necessary that $Y^1$ be inert to and unaffected by the reactants and reaction conditions used to prepare a polycarbonate. In some particular embodiments $Y^1$ comprises a halo group or $C_1$–$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

In the dihydroxyaromatic compound in which D is represented by formula (II) above, when more than one $Y^1$ substituent is present, they may be the same or different. The same holds true for the $R^1$ substituent. Where "s" is zero in formula (II) and "u" is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" are each one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments, dihydroxyaromatic compounds are of the formula (III):

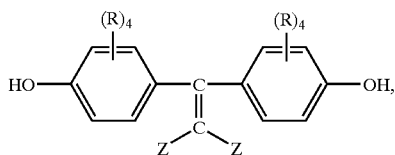

(III)

where independently each R is hydrogen, chlorine, bromine or a $C_{1-30}$ monovalent hydrocarbon or hydrocarbonoxy group, each Z is hydrogen, chlorine or bromine, subject to the provision that at least one Z is chlorine or bromine, or of the formula (IV):

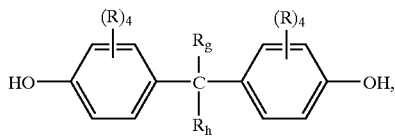

(IV)

where independently each R is as defined herein-before, and independently $R_g$ and $R_h$ are hydrogen or a $C_{1-30}$ hydrocarbon group.

In some embodiments of the present invention dihydroxyaromatic compounds that may be used include those disclosed by name or formula (generic or specific) in U.S. Pat. Nos. 2,991,273, 2,999,835, 3,028,365, 3,148172, 3,271,367, 3,271,368, and 4,217,438. In some embodiments of the invention dihydroxyaromatic compounds include 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (commonly known as bisphenol-A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; a $C_{1-3}$ alkyl-substituted resorcinol; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)-sulphide; 2-(3-methyl-4-hydroxyphenyl-2-(4-hydroxyphenyl)propane; 2-(3,5-dimethyl-4-hydroxyphenyl)-2-(4-hydroxyphenyl) propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methyl-butane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; and bis-(3,5-dimethylphenyl-4-hydroxyphenyl)-sulphide. In a particular embodiment the dihydroxyaromatic compound comprises bisphenol A.

Suitable dihydroxyaromatic compounds also include those containing indane structural units such as represented by the formula (V), which compound is 3-(4-hydroxyphenyl)-1,1,3-trimethylindan-5-ol, and by the formula (VI), which compound is 1-(4-hydroxyphenyl)-1,3,3-trimethylindan-5-ol:

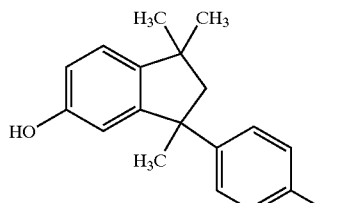

(V)

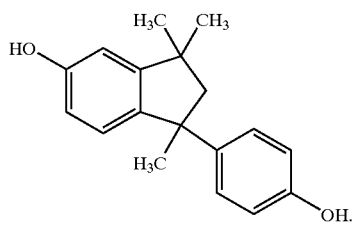

(VI)

Also included among suitable dihydroxyaromatic compounds are the 2,2,2',2-tetrahydro-1,1'-spirobi[1H-indene] diols having formula (VII):

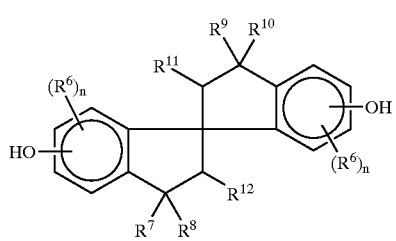

(VII)

wherein each $R^6$ is independently selected from monovalent hydrocarbon radicals and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-indene]-6,6'-diol (sometimes known as "SBI").

In various embodiments the carbonate precursor for preparing polycarbonates may be at least one carbonyl halide, carbonate ester or haloformate. The carbonyl halides which can be employed herein are carbonyl chloride, carbonyl bromide and mixtures thereof. Typical carbonate esters which may be employed herein include, but are not limited to, diaryl carbonates, including, but not limited to, diphenylcarbonate, di(halophenyl)carbonates, di(chlorophenyl)carbonate, di(bromophenyl)carbonate, di(trichlorophenyl)carbonate, di(tribromophenyl)carbonate; di(alkylphenyl)carbonates, di(tolyl)carbonate; di(naphthyl)carbonate, di(chloronaphthyl)carbonate, phenyl tolyl carbonate, chlorophenyl chloronaphthyl carbonate, di(methyl salicyl)carbonate, and mixtures thereof. The haloformates suitable for use herein include bishaloformates of dihydroxyaromatic compounds, which include, but are not limited to, bischloroformates of hydroquinone; bisphenol-A; 3-(4-hydroxyphenyl)-1,1,3-trimethylindan-5-ol; 1-(4-hydroxyphenyl)-1,3,3-trimethylindan-5-ol; 4,4'-(3,3,5-trimethylcyclohexylidene)diphenol; 1,1-bis(4-hydroxy-3-methylphenyl)cyclohexane, and the like; bischloroformate-terminated polycarbonate oligomers such as oligomers comprising hydroquinone, bisphenol-A, 3-(4-hydroxyphenyl)-1,1,3-trimethylindan-5-ol; 1-(4-hydroxyphenyl)-1,3,3-trimethylindan-5-ol; 4,4'-(3,3,5-trimethylcyclohexylidene)diphenol, 1,1-bis(4-hydroxy-3-methylphenyl)cyclohexane, or the like; and bishaloformates of glycols including, but not limited to, bishaloformates of ethylene glycol, neopentyl glycol, and polyethylene glycol. Mixtures of haloformates may be employed. In a particular embodiment carbonyl chloride, also known as phosgene, is employed. In another particular embodiment diphenylcarbonate is employed. Polycarbonate resins are made by known methods, such as, for example, interfacial polymerization, transesterification, solution polymerization or melt polymerization.

Suitable aromatic polycarbonate resins include linear aromatic polycarbonate resins and branched aromatic polycarbonate resins. Suitable linear aromatic polycarbonates resins include, for example, bisphenol A polycarbonate resin. Suitable branched polycarbonates are known and are made in various embodiments by reacting a polyfunctional aromatic compound with a dihydroxyaromatic compound and a carbonate precursor to form a branched polymer, see generally, U.S. Pat. Nos. 3,544,514, 3,635,895 and 4,001,184. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride. In some particular embodiments polyfunctional aromatic compounds are 1,1,1-tri(4-hydroxyphenyl)ethane, trimellitic anhydride or trimellitic acid or their haloformate derivatives.

In a particular embodiment the polycarbonate resin component of the present invention is a linear polycarbonate resin derived from bisphenol A and phosgene. In some particular embodiments the weight average molecular weight of the polycarbonate resin is in one embodiment from about 10,000 to about 200,000 grams per mole ("g/mol"), in another embodiment from about 20,000 to about 100,000 g/mol, in another embodiment from about 30,000 to about 80,000 g/mol, in another embodiment from about 40,000 to about 60,000 g/mol, and in still another embodiment from about 40,000 to about 50,000 g/mol, all as determined by gel permeation chromatography relative to polycarbonate standards. In one particular embodiment the weight average molecular weight of the polycarbonate resin is in a range of between about 15,000 and about 33,000 g/mol, as determined by gel permeation chromatography relative to polycarbonate standards. In various embodiments polycarbonate resins exhibit an intrinsic viscosity in one embodiment of about 0.1 to about 1.5 deciliters per gram, in another embodiment of about 0.35 to about 0.9 deciliters per gram, in another embodiment of about 0.4 to about 0.6 deciliters per gram, and in still another embodiment of about 0.48 to about 0.54 deciliters per gram, all measured in methylene chloride at 25° C.

In a polycarbonate-containing blend there may an improvement in melt flow and/or other physical properties when one molecular weight grade of a polycarbonate is combined with a proportion of a relatively lower molecular weight grade of similar polycarbonate. Therefore, the present invention encompasses compositions comprising only one molecular weight grade of a polycarbonate and also compositions comprising two or more molecular weight grades of polycarbonate. When two or more molecular weight grades of polycarbonate are present, then the weight average molecular weight of the lowest molecular weight polycarbonate is in one embodiment about 10% to about 95%, in another embodiment about 40% to about 85%, and in still another embodiment about 60% to about 80% of the weight average molecular weight of the highest molecular weight polycarbonate. In one representative, non-limiting embodiment polycarbonate-containing blends include those comprising a polycarbonate with weight average molecular weight between about 28,000 and about 32,000 combined with a polycarbonate with weight average molecular weight between about 16,000 and about 26,000 (in all cases relative to polycarbonate standards). When two or more molecular weight grades of polycarbonate are present, the weight ratios of the various molecular weight grades may range from about 1 to about 99 parts of one molecular weight grade and from about 99 to about 1 parts of any other molecular weight grades. In some embodiments a mixture of two molecular weight grades polycarbonate is employed, in which case the weight ratios of the two grades may range in one embodiment from about 99:1 to about 1:99, in another embodiment from about 80:20 to about 20:80, and in still another embodiment from about 70:30 to about 50:50. Since not all manufacturing processes for making a polycarbonate are capable of making all molecular weight grades of that constituent, the present invention encompasses compositions comprising two or more molecular weight grades of polycarbonate in which each polycarbonate is made by a different manufacturing process. In one particular embodiment the instant invention encompasses compositions comprising a polycarbonate made by an interfacial process in combination with a polycarbonate of different weight average molecular weight made by a melt process.

The amount of polycarbonate present in the compositions of the present invention is in one embodiment in a range of between about 55 wt % and about 98 wt %, in another embodiment in a range of between about 60 wt % and about 96 wt %, in another embodiment in a range of between about 70 wt % and about 96 wt %, in another embodiment in a range of between about 80 wt % and about 96 wt %, and in another embodiment in a range of between about 90 wt % and about 96 wt %, based on the weight of the entire composition.

The flame retardant resinous compositions of the present invention comprise at least one rubber modified graft copolymer comprising a discontinuous rubber phase dispersed in a continuous rigid thermoplastic phase, wherein at least a portion of the rigid thermoplastic phase is chemically grafted to the rubber phase. Hereinafter rubber modified graft copolymer is sometimes referred to as rubber modified thermoplastic resin. In one embodiment rubber modified graft copolymers comprise those made by a bulk or, synonymously, mass, polymerization process. In another embodiment rubber modified graft copolymers comprise those made by emulsion polymerization. Suitable rubbers for use in making the rubber phase comprise those having a glass transition temperature ($T_g$) of in one embodiment less than or equal to 25° C., in another embodiment less than or equal to 0° C., and in still another embodiment less than or equal to minus 30° C. In one embodiment the rubber comprises a polymer, often a linear polymer, having structural units derived from one or more conjugated diene monomers. Suitable conjugated diene monomers comprise, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene and dibromobutadiene as well as mixtures of conjugated diene monomers. In particular embodiments the conjugated diene monomer is at least one of 1,3-butadiene or isoprene.

The rubber may optionally include structural units derived from one or more copolymerizable monoethylenically unsaturated monomers selected from $C_2$–$C_8$ olefin monomers, vinyl aromatic monomers, monoethylenically unsaturated nitrile monomers, and $C_1$–$C_{12}$ alkyl (meth)acrylate monomers. As used herein, the term "$C_2$–$C_8$ olefin monomers" means a compound having from 2 to 8 carbon atoms per molecule and having a single site of ethylenic unsaturation per molecule. Suitable $C_2$–$C_8$ olefin monomers comprise, e.g., ethylene, propene, 1-butene, 1-pentene, and heptene. Suitable vinyl aromatic monomers, monoethylenically unsaturated nitrile monomers, and $C_1$–$C_{12}$ alkyl (meth)acrylate monomers comprise those set forth above in the description of the second thermoplastic resin.

In a particular embodiment the rubber is a polybutadiene homopolymer. In another embodiment the rubber is a copolymer, for example a block copolymer, comprising structural units derived from one or more conjugated diene monomers and up to 50 percent by weight ("wt %") structural units derived from one or more monomers selected from vinyl aromatic monomers and monoethylenically unsaturated nitrile monomers, such as, for example, a styrene-butadiene copolymer, an acrylonitrile-butadiene copolymer or a styrene-butadiene-acrylonitrile copolymer. In another particular embodiment the rubber is a styrene-butadiene block copolymer that contains from about 50 to about 95 wt % structural units derived from butadiene and from about 5 to about 50 wt % structural units derived from styrene. In another particular embodiment the rubber comprises structural units derived from butyl acrylate. In another particular embodiment the rubber is an ethylene-propylene-diene modified rubber.

The elastomeric rubber phase may be made by aqueous emulsion polymerization in the presence of a free radical initiator, a polyacid surfactant and, optionally, a chain transfer agent, and coagulated to form particles of elastomeric phase material. Suitable initiators comprise conventional free radical initiators such as, e.g., an organic peroxide compound, such as e.g., benzoyl peroxide; a persulfate compound, such as, e.g., potassium persulfate; an azonitrile compound such as, e.g., 2,2'-azobis-2,3,3-trimethylbutyronitrile; or a redox initiator system, such as, e.g., a combination of cumene hydroperoxide, ferrous sulfate, tetrasodium pyrophosphate and a reducing sugar or sodium formaldehyde sulfoxylate. Suitable chain transfer agents comprise, for example, a $C_9$–$C_{13}$ alkyl mercaptan compound such as nonyl mercaptan, or t-dodecyl mercaptan.

The emulsion polymerized particles of elastomeric rubber phase material have a weight average particle size in one embodiment of about 50 to about 1000 nanometers ("nm"), in another embodiment of about 50 to about 800 nm, and in another embodiment of from 100 to 500 nm, as measured by light transmission. The size of emulsion polymerized elastomeric particles may optionally be increased by mechanical, colloidal or chemical agglomeration of the emulsion polymerized particles according to known techniques.

The rigid thermoplastic resin phase comprises one or more thermoplastic polymers and exhibits a $T_g$ in one embodiment of greater than about 25° C., in another embodiment of greater than or equal to about 90° C. and in still another embodiment of greater than or equal to about 100° C. In a particular embodiment the rigid thermoplastic phase comprises one or more polymers each having structural units derived from one or more monomers selected from the group consisting of $C_1$–$C_{12}$ alkyl (meth)acrylate monomers, vinyl aromatic monomers and monoethylenically unsaturated nitrile monomers. Suitable vinyl aromatic monomers and monoethylenically unsaturated nitrile monomers and of $C_1$–$C_{12}$ alkyl (meth)acrylate monomers comprise those set forth above in the description of the rubber phase.

In a particular embodiment the rigid thermoplastic resin phase comprises a vinyl aromatic polymer having first structural units derived from one or more vinyl aromatic monomers, for example styrene, and having second structural units derived from one or more monoethylenically unsaturated nitrile monomers, for example acrylonitrile. The rigid phase comprises in some embodiments from about 55 to about 99 wt %, and in other embodiments from about 60 to about 90 wt %, structural units derived from styrene and in some embodiments from about 1 to about 45 wt %, and in other embodiments from about 10 to about 40 wt %, structural units derived from acrylonitrile.

The relative amount of rubber phase in the rubber modified graft copolymer is in one embodiment in a range between about 2 wt % and about 70 wt %, in another embodiment in a range between about 6 wt % and about 65 wt %, in another embodiment in a range between about 8 wt % and about 50 wt %, in another embodiment in a range between about 10 wt % and about 40 wt %, and in still another embodiment in a range between about 12 wt % and about 24 wt %, based on the weight of the rubber modified graft copolymer. The amount of grafting that takes place between the rigid thermoplastic phase and the rubber phase varies with the relative amount and composition of the rubber phase. In one embodiment from about 10 to about 90 wt % of the rigid thermoplastic phase is chemically grafted to the rubber phase and from about 10 to about 90 wt % of the rigid thermoplastic phase remains "free", i.e., non-grafted. In another embodiment from about 40 to about 75 wt % of the rigid thermoplastic phase is chemically grafted to the rubber phase and from about 25 to about 60 wt % of the rigid thermoplastic phase remains free.

In various embodiments the rigid thermoplastic phase of the rubber modified thermoplastic resin may be formed: (i) solely by polymerization carried out in the presence of the rubber phase or (ii) by addition of one or more separately polymerized rigid thermoplastic polymers to a rigid thermoplastic polymer that has been polymerized in the presence of the rubber phase. In a particular embodiment one or more separately polymerized rigid thermoplastic polymers is combined with a rigid thermoplastic polymer that has been polymerized in the presence of the rubber phase in order to aid in adjusting the viscosity of the composition of the present invention into some desired range. In a particular embodiment the weight average molecular weight of the one or more separately polymerized rigid thermoplastic polymers is from about 50,000 to about 100,000 g/mol. relative to polystyrene standards.

In another particular embodiment the rubber modified thermoplastic resin comprises a rubber phase comprising a polymer having structural units derived from one or more conjugated diene monomers, and, optionally, further comprising structural units derived from one or more monomers selected from vinyl aromatic monomers and monoethylenically unsaturated nitrile monomers; and the rigid thermoplastic phase comprises a polymer having structural units derived from one or more monomers selected from vinyl aromatic monomers and monoethylenically unsaturated nitrile monomers. In still another particular embodiment the rubber phase of the rubber modified thermoplastic resin comprises a polybutadiene or poly(styrene-butadiene) rubber and the rigid phase comprises a styrene-acrylonitrile copolymer.

Each of the polymers of the rubber phase and of the rigid thermoplastic resin phase of the rubber modified thermoplastic resin may, provided that the $T_g$ limitation for the respective phase is satisfied, optionally include structural units derived from one or more other copolymerizable monoethylenically unsaturated monomers such as, e.g., monoethylenically unsaturated carboxylic acids such as, e.g., acrylic acid, methacrylic acid, and itaconic acid; hydroxy $C_1$–$C_{12}$ alkyl (meth)acrylate monomers such as, e.g., hydroxyethyl methacrylate; $C_4$–$C_{12}$ cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides; maleic anhydride; and vinyl esters such as, e.g., vinyl acetate and vinyl propionate. As used in the present context the term "$C_4$–$C_{12}$ cycloalkyl" means a cyclic alkyl substituent group having from 4 to 12 carbon atoms per group and the term "(meth) acrylamide" refers collectively to acrylamides and methacrylamides. The rubber phase of rubber modified thermoplastic resin has a particle size in one embodiment of from about 0.1 to about 10 micrometers ("$\mu$m"), in another embodiment of from about 0.1 to about 3.0 micrometers, and in another embodiment from about 0.2 to about 2.0 $\mu$m.

The amount of rubber modified graft copolymer present in the compositions of the present invention is in one embodiment in a range of between about 0.1 wt % and about 35 wt %, in another embodiment in a range of between about 0.1 wt % and about 20 wt %, in another embodiment in a range of between about 0.2 wt % and about 16 wt %, in another embodiment in a range of between about 0.5 wt % and about 14 wt %, in still another embodiment in a range of between about 2 wt % and about 14 wt %, and in still another embodiment in a range of between about 2 wt % and about 6 wt %, based on the weight of the entire composition.

In various embodiments the flame retardant resinous compositions of the present invention comprise at least one silyl borate ester. The silyl borate esters may be made by reacting at least one alkylsilanol compound and at least one boron containing compound. In various embodiments the alkylsilanol compound is a silanol terminated alkylsilicone oligomer. In one embodiment the alkylsilanol compound is difunctional in silanol. The alkylsilanol has a degree of polymerization in one embodiment from about 1 to about 30; in another embodiment from about 1 to about 20; in another embodiment from about 1 to about 10; in another embodiment from about 2 to about 8; and in still another embodiment from about 3 to about 7. In some embodiments the alkyl groups of the alkylsilanol comprise methyl groups. In other embodiments the alkyl groups of the alkylsilanol comprise vinyl groups. In other embodiments the alkyl groups of the alkylsilanol comprise cycloaliphatic or cyclohexyl groups. In still other embodiments the alkyl groups of the alkylsilanol consist essentially of methyl groups. In still other embodiments the alkyl groups of the alkylsilanol consist essentially of methyl groups in combination with vinyl groups. In all embodiments of the invention the substituent groups of the alkylsilanol do not contain aromatic groups. In one particular embodiment a suitable alkylsilanol compound comprises a compound of the formula (VIII):

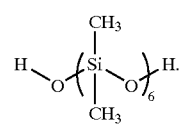

(VIII)

In one embodiment the boron containing compound is an oxide of boron. In a second embodiment the boron containing compound is a boric acid. The silyl borate esters of the present invention may be made by reacting the boron containing compound and the alkylsilanol compound in a solvent. Solvents that may be used include those in which the reactants are wholly or at least partially soluble, and those in which one or more reactants may progressively dissolve as the reaction occurs. Illustrative solvents include, but are not limited to, toluene, xylene, hexane, heptane, methylpentane and other solvents. In one embodiment of the present invention, stoichiometric quantities of the alkylsilanol compound and the boron containing compound may be used to prepare the silyl borate ester. In another embodiment a molar excess of the boron containing compound may be used. In one particular embodiment the molar ratio of boron containing compound to alkylsilanol compound may be 1:1 while in another embodiment the molar ratio of boron containing compound to alkylsilanol compound may be greater than 1:1. In some particular embodiments the molar ratio of boron containing compound to alkylsilanol compound may be at least 2:1 and in a other embodiments at least 3:1. In other embodiments the molar ratio of boron containing compound to alkylsilanol compound may be at least 4:1. In one embodiment of the present invention the alkylsilanol used may have a viscosity in a range of from about 10 centistokes (cst) to about 1000 cst, while in a second embodiment the alkylsilanol used may have a viscosity in a range of from about 50 cst to about 500 cst, and in a third embodiment the alkylsilanol used may have a viscosity in a range of from about 100 cst to about 300 cst. In many embodiments the alkylsilanol may have viscosities ranging from about 150 cst to about 200 cst. The water formed during the reaction may be removed by any known means including reduced pressure or azeotropic distillation. A glycol may sometimes be used to reduce the degree of crosslinking during the reaction of the alkylsilanol compound and the boron containing compound. Glycols that may be employed during the reaction of the alkylsilanol and the boron containing compound include but are not limited to ethylene glycol, propylene glycol and neopentyl glycol. The use of the glycol typically mitigates an unacceptable increase in viscosity during the synthesis. The quantity of the glycol used based on the total quantity of the alkylsilanol compound and the boron containing compound may be in one embodiment from about 0.1% to about 10% by weight; in another embodiment from about 0.2% to about 9% by weight; in another embodiment from about 0.5% to about 8% by weight; in another embodiment from about 1% to about 8% by weight; in another embodiment from about 2% to about 7% by weight; and in still another embodiment from about 3% to about 5% by weight.

In particular embodiments the reaction of alkylsilanol compound and boron containing compound is allowed to proceed until substantially all the alkylsilanol compound has reacted. In other particular embodiments the reaction of alkylsilanol compound and boron containing compound is allowed to proceed until essentially no more water of reaction can be removed from the reaction mixture under the reaction conditions, which may comprise azeotropic distillation or distillation under reduced pressure or other methods known in the art. Analytical methods for monitoring the concentration of alkylsilanol compound in the reaction mixture are well known to those skilled in the art, and may be applied as appropriate depending upon the degree of accuracy desired. Reaction of substantially all the alkylsilanol compound in the present context means that in one embodiment, greater than about 75 mole % of the alkylsilanol compound has reacted; in another embodiment, greater than about 80 mole % of the alkylsilanol compound has reacted; in another embodiment, greater than about 90 mole % of the alkylsilanol compound has reacted; in another embodiment, greater than about 95 mole % of the alkylsilanol compound has reacted; in another embodiment, greater than about 98 mole % of the alkylsilanol compound has reacted; and in another embodiment, greater than about 99 mole % of the alkylsilanol compound has reacted. In a particular embodiment, essentially all the alkylsilanol compound reacts which means in the present context that none can be detected using the chosen analytical method.

In various embodiments silyl borate esters used in the present invention may comprise structures represented by formulae (IX), (X), and (XI):

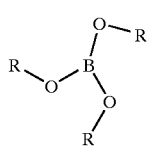

(IX)

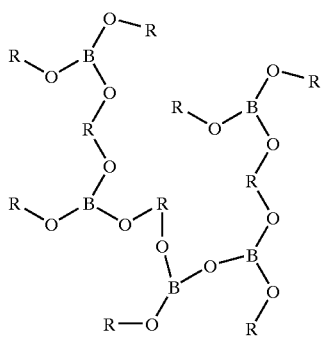

(X)

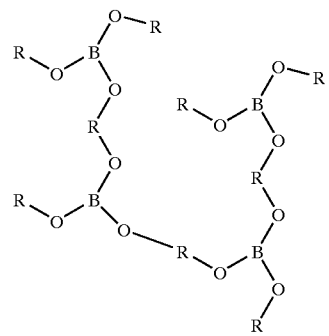

(XI)

wherein R represents a structural unit derived from alkylsilanol. In addition depending upon the ratio of boron to alkylsilanol, the silyl borate ester may comprise B—O—B linkages as depicted in formula (XII) when greater than stoichiometric amounts of boron containing compound are used relative to alkylsilanol:

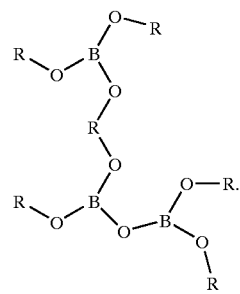

(XII)

Those skilled in the art will recognize that the actual structures of silyl borate esters used in the present invention may be only approximated by structures (IX)–(XII) and that in some embodiments said structures (IX)–(XII) may comprise only a portion of those structures contained in the silyl borate esters. In addition, although structures (IX)–(XII) are depicted with implied free silanol groups, it is possible that free silanol groups may be essentially absent from those structures contained in the silyl borate esters, or else only present in low concentration.

A silyl borate ester is present in the compositions of the present invention in an amount in one embodiment in a range of between about 0.1 wt % and about 10 wt %, in another embodiment in a range of between about 0.2 wt % and about 6 wt %, in another embodiment in a range of between about 0.2 wt % and about 5 wt %, in still another embodiment in a range of between about 1 wt % and about 4.5 wt %, and in still another embodiment in a range of between about 2 wt % and about 4.5 wt %, based on the weight of the entire composition.

The flame retardant resinous compositions of the present invention comprise at least one polymeric or non-polymeric organic phosphorus species selected from the group consisting of phosphate esters, thiophosphate esters, phosphonate esters, thiophosphonate esters, phosphinate esters, thiophosphinate esters, phosphines, including triphenylphosphine, phosphine oxides, including triphenylphosphine oxide and tris(2-cyanoethyl)phosphine oxide, thiophosphine oxides, and phosphonium salts. In some embodiments organic phosphorus species are non-polymeric phosphate esters including, for example, alkyl phosphate esters, aryl phosphate esters, resorcinol-based phosphate esters, and bisphenol-based phosphate esters. In other embodiments organic phosphorus species are aromatic phosphates. Illustrative, non-limiting examples of such phosphorus species include triphenylphosphate, tricresylphosphate, resorcinol bis(diphenylphosphate), bisphenol A bis (diphenylphosphate), and other aromatic phosphate esters known in the art.

The organic phosphorus species is present in the compositions of the invention in an amount in one embodiment in a range of between about 0.5 wt % and about 15 wt %, in another embodiment in a range of between about 1 wt % and about 8 wt %, and in still another embodiment in a range of between about 2 wt % and about 6 wt %, based on the weight of the entire composition.

In various embodiments the flame retardant resinous compositions of the present invention comprise at least one fluoropolymer additive in an amount that is effective to provide anti-drip properties to the resin composition. The amount of fluoropolymer present in the compositions is in one embodiment in a range of between about 0.01 wt % and about 2 wt %, and in another embodiment in a range of between about 0.1 wt % and about 1 wt %, based on the weight of the entire composition. Suitable fluoropolymers and methods for making such fluoropolymers are known, see, e.g., U.S. Pat. Nos. 3,671,487 and 3,723,373. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Suitable fluorinated alpha-olefin monomers include, e.g., fluoroethylenes such as, e.g., $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$ and fluoropropylenes such as, e.g., $CF_3CF=CF_2$, $CF_3CH=CHF$, $CF_3CH=CF_2$, $CF_3CH=CH_2$, $CF_3CF=CHF$, $CHF_2CH=CHF$ and $CF_3CF=CH_2$. In a particular embodiment the fluorinated alpha-olefin monomer is one or more of tetrafluoroethylene ($CF_2=CF_2$), chlorotrifluoroethylene ($CClF=CF_2$), vinylidene fluoride ($CH_2=CF_2$) and hexafluoropropylene ($CF_2=CFCF_3$). In various embodiments suitable fluorinated alpha-olefin homopolymers include e.g., poly(tetrafluoroethylene) and poly (hexafluoroethylene). In other embodiments suitable fluorinated alpha-olefin copolymers include copolymers comprising structural units derived from two or more fluorinated alpha-olefin copolymers such as, e.g., poly (tetrafluoroethylene-hexafluoroethylene), and copolymers comprising structural units derived from one or more fluorinated monomers and one or more non-fluorinated monoethylenically unsaturated monomers that are copolymerizable with the fluorinated monomers such as, e.g., poly (tetrafluoroethylene-ethylene-propylene) copolymers. Suitable non-fluorinated monoethylenically unsaturated monomers include e.g., alpha-olefin monomers such as, e.g., ethylene, propylene, butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate. In a particular embodiment the fluoropolymer particles range in size from about 50 nm to about 500 nm as measured by electron microscopy. In a particular embodiment the fluoropolymer is a poly(tetrafluoroethylene) homopolymer ("PTFE").

Since direct incorporation of a fluoropolymer into a thermoplastic resin composition tends to be difficult, the fluoropolymer may in one embodiment be preblended in some manner with a second polymer to form a concentrate. In one embodiment the second polymer is at least one other resinous component of the composition. In a particular embodiment the second polymer is a thermoplastic resin, such as for example an aromatic polycarbonate resin or a styrene-acrylonitrile resin. For example, an aqueous dispersion of fluoropolymer and a polycarbonate resin may be steam precipitated to form a fluoropolymer concentrate for use as a drip inhibitor additive in thermoplastic resin compositions, as disclosed in, for example, U.S. Pat. No. 5,521,230, or, alternatively, an aqueous styrene-acrylonitrile resin emulsion, or an aqueous acrylonitrile-butadiene-styrene resin emulsion may be used, wherein following precipitation a co-coagulated fluoropolymer-thermoplastic resin composition is dried to provide a PTFE-thermoplastic resin powder as disclosed in, for example, U.S. Pat. No. 4,579,906.

The fluoropolymer additive in the form of fluoropolymer-thermoplastic resin powder comprises in one embodiment from about 10 to about 90 wt %, in another embodiment from about 30 to about 70 wt %, and in still another embodiment from about 40 to about 60 wt % fluoropolymer, and in one embodiment from about 30 to about 70 wt %, and in another embodiment from about 40 to about 60 wt % of the second polymer.

In another embodiment a fluoropolymer additive may be made by emulsion polymerization of one or more monoethylenically unsaturated monomers in the presence of aqueous fluoropolymer dispersion to form a second polymer in the presence of the fluoropolymer. Suitable monoethylenically unsaturated monomers are disclosed above. The emulsion is then precipitated, e.g., by addition of sulfuric acid. The precipitate is dewatered, e.g., by centrifugation, and then dried to form a fluoropolymer additive that comprises fluoropolymer and an associated second polymer. The dry emulsion polymerized fluoropolymer additive is in the form of a free-flowing powder. In another embodiment the monoethylenically unsaturated monomers that are emulsion polymerized to form the second polymer comprise one or more monomers selected from vinyl aromatic monomers, monoethylenically unsaturated nitrile monomers and $C_1$–$C_{12}$ alkyl (meth)acrylate monomers. Suitable vinyl aromatic monomers, monoethylenically unsaturated nitrile monomers and $C_1$–$C_{12}$ alkyl (meth)acrylate monomers are disclosed above. In a particular embodiment the second polymer comprises structural units derived from styrene and acrylonitrile. In another particular embodiment the second polymer comprises from about 60 to about 90 wt % structural units derived from styrene and from about 10 to about 40 wt % structural units derived from acrylonitrile. The emulsion polymerization reaction mixture may optionally include emulsified or dispersed particles of a third polymer, such as, e.g., an emulsified butadiene rubber latex. The emulsion polymerization reaction may be initiated using a conventional free radical initiator, as disclosed above with respect to the rubber modified graft copolymer. A chain transfer agent such as, e.g., a $C_9$–$C_{13}$ alkyl mercaptan compound such as nonyl mercaptan, t-dodecyl mercaptan, may, optionally, be added to the reaction vessel during the polymerization reaction to reduce the molecular weight of the second polymer. In a particular embodiment, no chain transfer agent is used. In another embodiment, the stabilized fluoropolymer dispersion is charged to a reaction vessel and heated with stirring. The initiator system and the one or more monoethylenically unsaturated monomers are then charged to the reaction vessel and heated to polymerize the monomers in the presence of the fluoropolymer particles of the dispersion to thereby form the second polymer. Suitable fluoropolymer additives and emulsion polymerization methods are disclosed, for example, in U.S. Pat. No. 5,804,654. In a particular embodiment, the second polymer exhibits a weight average molecular weight of from about 10,000 to about 200,000 g/mol. relative to polystyrene standards.

The term "alkyl" as used in the various embodiments of the present invention is intended to designate both normal alkyl, branched alkyl, aralkyl, and cycloalkyl radicals. In various embodiments normal and branched alkyl radicals are those containing from 1 to about 30 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals represented are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 18 ring carbon atoms. Some illustrative non-limiting examples of these aryl radicals include phenyl, biphenyl, and naphthyl.

The flame retardant resinous compositions of the invention may also contain other conventional additives including antistatic agents, stabilizers such as heat stabilizers and light stabilizers, pigments, dyes, UV screeners, inhibitors, plasticizers, flow promoters, auxiliary flame retardants, mold release agents, impact modifiers, ester interchange inhibitors, other anti-drip agents, and fillers. In some embodiments compositions of the invention comprise either at least one extending filler, or at least one reinforcing filler, or both of at least one extending filler and at least one reinforcing filler. Representative examples of extending fillers comprise carbon black, silica, alumina, magnesia, talc, mica, glass beads, hollow glass beads, and the like. Representative examples of reinforcing fillers comprise carbon fibers, glass fibers, quartz, and the like. Representative examples of mold release agents include pentaerythritol tetrastearate, octyl behenate, and polyethylene. Inorganic phosphates such as ammonium polyphosphate, which may result in decomposition of polycarbonate, are not necessary in compositions of the present invention and are consequently absent in all embodiments. In addition, stabilizer additives which are polyfunctional alcohols, such as mannitol, sorbitol, fructose, glucose, pentaerythritol, cyclodextrin, sucrose, galactose, maltose, ribose, and xylitol are not necessary in compositions of the present invention and are consequently absent in all embodiments.

It is possible that additives and/or polymeric resins of the compositions under certain processing conditions may at least partially react through processes well known in the art. Therefore, the various embodiments of the invention are inclusive of compositions in which one or more of components has undergone chemical reaction, either by itself or in combination with at least one other blend component. That is, the invention includes both compositions comprising said components as initially present and compositions comprising any reaction products thereof. When proportions are specified in the compositions, they apply to the originally incorporated materials rather than those remaining after any such reaction.

In another embodiment the present invention comprises methods for making the compositions disclosed herein. The flame retardant resinous compositions of the present invention may be made by combining and mixing the components of the composition under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition. In some embodiments one or more components can be added to the composition as an aqueous mixture or solution followed by devolatilization in appropriate processing equipment such as in an extruder. In another embodiment boron source and stabilizer may be mixed in aqueous solution and then evaporated to form a material which can be added to compositions of the invention. The thermoplastic resin compositions of the present invention can be molded into useful shaped articles by a variety of means such as injection molding, extrusion, rotational molding, blow molding and thermoforming to form articles such as, for example, computer and business machine housings, home appliances.

The compositions of the present invention show improved flame resistance as tested by the UL94 testing protocol. Compositions comprising silyl borate esters also often show improved resistance to drip during the flame test. The invention allows for elimination of halogen-based flame retardants, and a reduction or elimination of phosphorus-based flame retardants which can negatively affect physical properties such as polycarbonate glass transition temperature and concomitant heat deflection temperature of composition molded parts.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples the components were a first bisphenol A polycarbonate (hereinafter referred to sometimes as "first polycarbonate") with a weight average molecular weight (relative to polycarbonate standards) in a range of between about 16,000 and about 26,000; a second bisphenol A polycarbonate (hereinafter referred to sometimes as "second polycarbonate") with a weight average molecular weight (relative to polycarbonate standards) in a range of between about 28,000 and about 32,000; ABS comprising about a 75:25 weight ratio of styrene to acrylonitrile and about 8–25% grafted polybutadiene with overall weight average molecular weight of the styrene/acrylonitrile portion in a range of between about 50,000 and about 100,000 relative to polystyrene standards. Polycarbonate-siloxane copolymer was about 20 wt % polydimethylsiloxane-containing copolymer with bisphenol A polycarbonate, wherein the initial silicone starting material has a degree of polymerization of about 50 (D50). Alkylsilanols employed were silanol-terminated polydimethylsiloxanes. Compositions in the examples were prepared by dry blending in a Henschel mixer following by extrusion and molding. Flame resistance of molded compositions was measured by the UL94 protocol using one-sixteenth inch thick test bars which had been conditioned for 48 hours at room temperature and 50% relative humidity.

EXAMPLE 1

The silyl borate esters were prepared by the following general procedure. A alkylsilanol fluid was employed which was a silanol-terminated polydimethylsiloxane fluid with a degree of polymerization of about 6 and a viscosity of about 25 cst. A boron compound was added to a solution of alkylsilanol fluid in toluene and the suspension was stirred and refluxed with continuous removal of water Once the water evolution had ceased (approximately 5–10 hours) the solution was cooled, and in some case decanted from any solid, and the toluene removed under reduced pressure. The material was then used directly. Results are shown in Table 1.

TABLE 1

| Entry | Boron compound (g) | Silanol amount (g) | Toluene amount (mL) | Comment |
|---|---|---|---|---|
| 1 | Boron oxide (5.25) | 125 | 250 | Product is viscous oil |
| 2 | Boric acid (21.2) | 125 | 350 | Product is a solid |
| 3 | Boron oxide (12.0) | 125 | 300 | Product is a viscous oil, separated by decantation from unreacted boron oxide. Product contains only 6.0 g boron oxide | are not believed to affect the flame resistance properties. Control example 2 (CEx. 2) and the compositions of the invention were prepared by replacing a portion of the polycarbonate in the control composition with either boron phosphate (CEx. 2), or a mixture of BPADP and boron phosphate or a mixture of BPADP and silyl borate. All the compositions of the invention also contained 0.6 wt % of mold release agents and thermal stabilizers which are not believed to affect the flame resistance properties. The results for flame resistance tests are shown in Table 2 compared to the control composition with BPADP. The composition with BPADP and the silyl borate ester show superior flame out time (FOT) data. "Total Avg. FOT" is the sum of the average of first flame out time and second flame out time. The designation "good" under "Surface appearance" means that molded part surfaces exhibited natural resin coloration and no evidence of surface inhomogeneity or splay.

TABLE 2

| Components | C Ex. 1 | C Ex. 2 | 1 | 2 | 3 | 4 | 5 | 6 |
|---|---|---|---|---|---|---|---|---|
| First Polycarbonate | 64.48 | 52.26 | 66.3 | 64.9 | 66.2 | 64.8 | 66 | 64.6 |
| Second Polycarbonate | 28 | 24 | 24 | 24 | 24 | 24 | 24 | 24 |
| Polycarbonate-silicone copolymer (20% Si) | | 13.35 | | | | | | |
| Ground bulk ABS | 4 | 4 | 4 | 4 | 4 | 4 | 4 | 4 |
| Teflon (50% in SAN) | 1 | 0.5 | 0.5 | 0.5 | 0.5 | 0.5 | 0.5 | 0.5 |
| BPADP | 2 | 2 | 2 | 2 | 2 | 2 | 2 | 2 |
| Table 1 entry 1 | | | 2.6 | 4 | | | | |
| Table 1 entry 2 | | | | | 2.9 | 4.3 | | |
| Table 1 entry 3 | | | | | | | 2.7 | 4.1 |
| Boron Phosphate | | 3.29 | | | | | | |
| Total | 100 | 100 | 100 | 100 | 100.2 | 100.2 | 99.8 | 99.8 |
| UL-94 FOT 1 in seconds (10 bar average) | 3 | 3.68 | 14.1 | 8.4 | 3.6 | 5.5 | 28.5 | 12.2 |
| UL-94 FOT 2 in seconds (10 bar average) | 15 | 8.1 | >40 | 19.4 | 5.5 | 5.5 | 12.6 | 28.4 |
| Total Avg. FOT | 18 | 11.78 | >54 | 27.8 | 9.1 | 11 | 41.1 | 40.6 |
| Surface appearance | good | gray color; grainy surface | good | good | good | good | good | good |

EXAMPLE 2

The following general procedure was followed in preparing and testing all blends. Well mixed dry blends were prepared by intensively dispersing all blend components in a Henschel mixer. These dry blends were extruded on a twin screw extruder operating at typical PC/ABS processing temperatures and conditions. Test specimen were molded on an injection molder with a nominal melt temperature of 240–270° C. ASTM test parts were molded and tested as per the appropriate ASTM protocol. Compositions were prepared comprising the amounts of components shown in Table 2. All wt % values are based on the weight of the entire composition. A control composition (CEx. 1) was prepared comprising 64.48 wt % of a first polycarbonate, 28 wt % of a second polycarbonate, 4 wt % bulk ground ABS, 1 wt % of a 50% concentrate of polytetrafluoroethylene in SAN, and 2 wt % BPADP. The control composition also contained 0.52 wt % of mold release agents and thermal stabilizers which The data show that silyl borate esters prepared using greater than 1:1 molar ratio of boron containing compound to alkylsilanol provide an improvement in UL-94 performance while also providing good surface properties of molded parts.

EXAMPLE 3

Preparation of Mixed Silyl Borate Esters

1) A mixture of 126.5 gm higher molecular weight alkylsilanol fluid (65 centistokes), 3.55 gm boric acid and 350 ml toluene was refluxed with azeotropic removal of water. After 3 hours the reaction viscosity had increased to an unmanageable level such that stirring could not be continued and the reaction mixture had to be discarded.

2) A mixture of 125 gms higher molecular weight alkylsilanol fluid (65 cst), 10.0 gms boric acid, 0.85 gms ethylene glycol and 350 ml toluene was refluxed with azeotropic removal of water. In contrast to reaction 1, the solution viscosity remained low and after 5 hours of reflux with azeotropic removal of water, the solution was decanted from 4 gm of unreacted boric acid and concentrated to a semisolid. This example is represented as entry 4 in Table 3 below. Other mixed silyl borate esters were prepared as shown in Table 3.

TABLE 3

| Entry | Boron compound (gm) | Silanol (gm) | Ethylene glycol (gm) | Toluene (mL) | Comments |
|---|---|---|---|---|---|
| 1 | Boric acid (0.3) | 750 cst (125) | 0 | 350 | Concentrated to a viscous oil |
| 2 | Boric acid (7) | 750 cst (125) | 1.7 | 350 | Decanted from 3 gm of unreacted boric acid concentrated to a viscous oil/solid |
| 3 | Boric acid (7) | 750 cst (125) | 0.5 | 350 | Decanted from 4 gm of unreacted boric acid concentrated to a semi-solid |
| 4 | Boric acid (10) | 65 cst (125) | 0.85 | 350 | Decanted from 4 gm of unreacted boric acid concentrated to a semi-solid |
| 5 | Boric acid (5) | 65 cst (125) | 0.5 | 350 | Decanted from 1 gm of unreacted boric acid concentrated to a semi-solid |

EXAMPLE 4

A composition (composition 1) was prepared comprising 52.26 wt % of a first polycarbonate; 24 wt % of a second polycarbonate, 13.35 wt % polycarbonate-siloxane copolymer, 4 wt % ABS; 2 wt % bisphenol A bis(diphenylphosphate) (BPADP); 3.29 wt % boron phosphate, and 0.5 wt % of a 50% concentrate of polytetrafluoroethylene in SAN, wherein all wt % values are based on the weight of the entire composition. Compositions of the invention were then prepared by replacing the polycarbonate-siloxane copolymer in the composition with the first polycarbonate and a mixed silyl borate ester from Table 3. All compositions in Table 4 also contained 0.6 wt % of mold release agents and thermal stabilizers which are not believed to affect the flame resistance properties. The results for flame resistance tests are shown in Table 4. The compositions with BPADP and mixed silyl borate esters give superior flame out times compared to control.

TABLE 4

Compositional and UL-94 Data for mixed silyl borate formulations

| Components | 1 | 2 | 3 | 4 | 5 | 6 |
|---|---|---|---|---|---|---|
| First Polycarbonate | 52.26 | 66.3 | 66.3 | 66.3 | 66.3 | 66.3 |
| Second Polycarbonate | 24 | 24 | 24 | 24 | 24 | 24 |
| Polycarbonate-silicone copolymer (20% Si) | 13.35 | | | | | |
| Ground bulk ABS | 4 | 4 | 4 | 4 | 4 | 4 |
| Teflon (50% in SAN) | 0.5 | 0.5 | 0.5 | 0.5 | 0.5 | 0.5 |
| BPADP | 2 | 2 | 2 | 2 | 2 | 2 |
| Table 3 entry-1 | | 2.6 | | | | |
| Table 3 entry-2 | | | 2.6 | | | |
| Table 3 entry-3 | | | | 2.6 | | |
| Table 3 entry-4 | | | | | 2.6 | |
| Table 3 entry-5 | | | | | | 2.6 |
| Boron Phosphate | 3.29 | | | | | |
| Total | 100 | 100 | 100 | 100 | 100 | 100 |
| UL-94 FOT 1 in seconds | 4.5 | 9.8 | 4.6 | 5.1 | 5.1 | 1.8 |
| UL-94 FOT 2 in seconds | 9.9 | 44 | 32.7 | 31.5 | 8.5 | 14.8 |
| Total Avg. FOT | 14.4 | 53.8 | 37.3 | 36.6 | 13.6 | 16.6 |

The data show that silyl borate esters prepared using greater than 1:1 molar ratio of boron containing compound to alkylsilanol provide an improvement in UL-94 performance. In all of the compositions of the invention in Table 4, molded parts exhibited good surface properties.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents cited herein are incorporated herein by reference.

What is claimed is:

1. A flame retardant resinous composition comprising (i) at least one aromatic polycarbonate, (ii) at least one a rubber modified graft copolymer, (iii) at least one silyl borate ester, (iv) at least one organophosphorus compound, and (v) at least one fluoropolymer additive.

2. The composition of claim 1 wherein the aromatic polycarbonate comprises structural units derived from at least one dihydroxyaromatic compound of the structure HO-D-OH, wherein D is a divalent aromatic radical with the structure of formula:

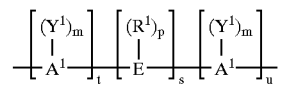

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of hydrogen, a monovalent hydrocarbon group, alkenyl, allyl, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

3. The composition of claim 1 the aromatic polycarbonate comprises structural units derived from at least one dihydroxyaromatic compound selected from the group consisting of 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl) heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6- dimethyl-3-methoxyphenyl)methane; 1,1-bis(4-hydroxyphenyl)ethane; 1,1-bis(4-hydroxy-2-chlorophenyl) ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; a $C_{1-3}$ alkyl-substituted resorcinol; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)-sulphide; 2-(3-methyl-4-hydroxyphenyl-2-(4-hydroxyphenyl)propane; 2-(3,5-dimethyl-4-hydroxyphenyl)-2-(4-hydroxyphenyl) propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; bis-(3,5-dimethylphenyl-4-hydroxyphenyl)-sulphide; 3-(4-hydroxyphenyl)-1,1,3-trimethylindan-5-ol, 1-(4-hydroxyphenyl)-1,3,3-trimethylindan-5-ol; and 2,2,2',2'-tetrahydro-3,3,3',3'-tetramethyl-1,1'-spirobi[1H-indene]-6,6'-diol.

4. The composition of claim 3 wherein the dihydroxyaromatic compound is bisphenol A.

5. The composition of claim 1 wherein the aromatic polycarbonate is present in an amount in a range from about 55 wt % to about 98 wt %, based on the weight of the entire composition.

6. The composition of claim 5 wherein the aromatic polycarbonate is present in an amount in a range from 90 wt % to about 96 wt %, based on the weight of the entire composition.

7. The composition of claim 1 wherein the rubber modified graft copolymer comprises a discontinuous rubber phase dispersed in a continuous rigid thermoplastic phase, wherein at least a portion of the rigid thermoplastic phase is chemically grafted to the rubber phase.

8. The composition of claim 7 wherein the rubber phase has a glass transition temperature of less than or equal to 25° C.

9. The composition of claim 8 wherein the rubber comprises structural units derived from at least one of 1,3-butadiene, isoprene, or butyl acrylate.

10. The composition of claim 9 wherein the rigid thermoplastic resin has a glass transition temperature of greater than 25° C., and from about 10 to about 90 wt % of the rigid thermoplastic phase is chemically grafted to the rubber phase.

11. The composition of claim 7 wherein the rubber phase comprises a polybutadiene rubber, poly(styrene-butadiene) rubber, poly(butyl acrylate) rubber, or ethylene-propylene-diene modified rubber, and the rigid thermoplastic phase comprises a styrene-acrylonitrile copolymer.

12. The composition of claim 7 wherein the rubber modified graft copolymer is present in an amount in a range of between about 0.1 wt % and about 20 wt %, based on the weight of the entire composition.

13. The composition of claim 12 wherein the rubber modified graft copolymer is present in an amount in a range of between about 2 wt % and about 6 wt %, based on the weight of the entire composition.

14. The composition of claim 1 wherein the silyl borate ester is a reaction product of at least one alkylsilanol compound and at least one boron containing compound, wherein the molar ratio of boron containing compound to alkylsilanol is about 1:1.

15. The composition of claim 14 wherein the molar ratio of boron containing compound to alkylsilanol is greater than 1:1.

16. The composition of claim 14 wherein the alkyl groups bound to silicon in the alkylsilanol compound are selected from the group consisting of methyl, vinyl, and mixtures thereof.

17. The composition of claim 16 wherein the alkylsilanol compound comprises a silanol terminated polydimethylsiloxane with a degree of polymerization in a range of between 1 and 30.

18. The composition of claim 14 wherein the boron containing compound is at least one member selected from the group consisting of boric acids and boron oxides.

19. The composition of claim 1 wherein the organophosphorus compound is at least one polymeric or non-polymeric organic phosphorus compound selected from the group consisting of phosphate esters, thiophosphate esters, phosphonate esters, thiophosphonate esters, phosphinate esters, thiophosphinate esters, phosphines, triphenylphosphine, phosphine oxides, triphenylphosphine oxide, tris(2-cyanoethyl)phosphine oxide, thiophosphine oxides, and phosphonium salts.

20. The composition of claim 19 wherein the organophosphorus compound is an aromatic phosphate.

21. The composition of claim 20 wherein the aromatic phosphate is selected from the group consisting of triphenylphosphate, tricresylphosphate, resorcinol bis (diphenylphosphate), and bisphenol A bis (diphenylphosphate).

22. The composition of claim 19 wherein the organophosphorus compound is present in an amount in a range from about 0.5 wt % to about 15 wt %, based on the weight of the entire composition.

23. The composition of claim 1 wherein the fluoropolymer is present in an amount in a range from about 0.01 wt % to about 2 wt %, based on the weight of the entire composition.

24. The composition of claim 23 wherein the fluoropolymer comprises polytetrafluoroethylene.

25. The composition of claim 23 wherein the fluoropolymer is added to the composition in the form of a concentrate.

26. A flame retardant resinous composition comprising:
(vi) at least one bisphenol A polycarbonate present in an amount in a range from about 90 wt % to about 96 wt %;
(vii) at least one a rubber modified graft copolymer, comprising a discontinuous rubber phase dispersed in a continuous rigid thermoplastic phase, wherein at least a portion of the rigid thermoplastic phase is chemically grafted to the rubber phase, wherein the rubber phase comprises a polybutadiene rubber, poly(styrene-butadiene) rubber, poly(butyl acrylate) rubber, or ethylene-propylene-diene modified rubber, and the rigid thermoplastic phase comprises a styrene-acrylonitrile copolymer, and wherein the rubber modified graft copolymer is present in an amount in a range from about 2 wt % to about 6 wt %;
(viii) at least one silyl borate ester, which is a reaction product of at least one silanol terminated polydimethylsiloxane compound with a degree of polymerization in a range from 1 to 30 and at least one boron containing compound selected from the group consisting of boric acids and boron oxides, wherein the molar ratio of boron containing compound to alkylsilanol is about 1:1 and wherein the silyl borate ester is present in an amount in a range from about 0.5 wt % to about 15 wt %;

(ix) at least one organophosphorus compound selected from the group consisting of triphenylphosphate, tricresylphosphate, resorcinol bis(diphenylphosphate), and bisphenol A bis(diphenylphosphate), wherein the organophosphorus compound is present in an amount in a range from about 1 wt % to about 8 wt %; and (x) polytetrafluoroethylene, present in an amount in a range from about 0.01 wt % to about 2 wt %;

wherein all amounts are based on the weight of the entire composition.

27. The composition of claim 26 wherein the molar ratio of boron containing compound to alkylsilanol is greater than 1:1.

28. A method for making a flame retardant resinous composition comprising:

(vi) at least one bisphenol A polycarbonate present in an amount in a range from about 90 wt % to about 96 wt %;

(vii) at least one a rubber modified graft copolymer, comprising a discontinuous rubber phase dispersed in a continuous rigid thermoplastic phase, wherein at least a portion of the rigid thermoplastic phase is chemically grafted to the rubber phase, wherein the rubber phase comprises a polybutadiene rubber, poly(styrene-butadiene) rubber, poly(butyl acrylate) rubber, or ethylene-propylene-diene modified rubber, and the rigid thermoplastic phase comprises a styrene-acrylonitrile copolymer, and wherein the rubber modified graft copolymer is present in an amount in a range from about 2 wt % to about 6 wt %;

(viii) at least one silyl borate ester, which is a reaction product of at least one silanol terminated polydimethylsiloxane compound with a degree of polymerization in a range from 1 to 30 and at least one boron containing compound selected from the group consisting of boric acids and boron oxides, wherein the molar ratio of boron containing compound to alkylsilanol is about 1:1 and wherein the silyl borate ester is present in an amount in a range from about 0.5 wt % to about 15 wt %;

(ix) at least one organophosphorus compound selected from the group consisting of triphenylphosphate, tricresylphosphate, resorcinol bis(diphenylphosphate), and bisphenol A bis(diphenylphosphate), wherein the organophosphorus compound is present in an amount in a range from about 1 wt % to about 8 wt %; and (x) polytetrafluoroethylene, present in an amount in a range from about 0.01 wt % to about 2 wt %;

wherein all amounts are based on the weight of the entire composition;

which comprises combining and mixing the components of the composition under conditions suitable for the formation of a blend of the components, and, optionally, then reducing the composition so formed to particulate form.

29. The method of claim 28 wherein polytetrafluoroethylene is added to the composition in the form of a concentrate.

30. The method of claim 28 wherein the molar ratio of boron containing compound to alkylsilanol is greater than 1:1.

* * * * *